United States Patent [19]
Takeuchi

[11] Patent Number: 5,931,336
[45] Date of Patent: Aug. 3, 1999

[54] RECEPTACLE

[75] Inventor: Takashi Takeuchi, Kanagawa-ken, Japan

[73] Assignee: Nissan Motor Co., Ltd., Kanagawa-ken, Japan

[21] Appl. No.: 08/866,243

[22] Filed: Jun. 2, 1997

[30] Foreign Application Priority Data

May 31, 1996 [JP] Japan ................................. 8-138470

[51] Int. Cl.$^6$ ............................................ B65D 69/00
[52] U.S. Cl. ........................................ 220/836; 220/840
[58] Field of Search .......................... 220/4.22, 836, 220/840, 810

[56] References Cited

U.S. PATENT DOCUMENTS

| | | | |
|---|---|---|---|
| 526,110 | 9/1894 | Martin | 220/830 |
| 2,520,508 | 8/1950 | Morrison | 220/836 |
| 5,022,529 | 6/1991 | Kang | 220/830 |
| 5,109,980 | 5/1992 | Matsuoka et al. | 220/840 |
| 5,213,229 | 5/1993 | Taniyama | 220/840 |
| 5,533,642 | 7/1996 | La Fond et al. | 220/830 |
| 5,769,260 | 6/1998 | Killinger et al. | 220/830 |

FOREIGN PATENT DOCUMENTS

| | | |
|---|---|---|
| 60-24657 | 2/1985 | Japan . |
| 60-42869 | 3/1985 | Japan . |
| 5-338496 | 12/1993 | Japan . |

*Primary Examiner*—Joseph M. Moy
*Attorney, Agent, or Firm*—McDermott, Will & Emery

[57] ABSTRACT

There is provided a receptacle comprising a box body which is formed with right and left engagement parts, and a lid body which is formed with right and left engaged parts which engage with the right and left engagement parts of the box body so that an engagement of engagement parts and engaged parts is freely released. When the right and left engagement parts both engage with the right and left engaged parts, the lid body is kept at a state of being closed. When the left engagement part engages with the left engaged part and the engagement of the right engagement part with the right engaged part is released, the lid body is rotatable on the axis of the engaged left parts and is opened from the right-hand side. When the right engagement part engages with the right engaged part and the engagement of the left engagement part with the left engaged part is released, the lid body is rotatable on the axis of the engaged right parts and is opened from the left-hand side.

15 Claims, 9 Drawing Sheets

RECEPTACLE

BACKGROUND OF THE INVENTION

The present invention relates to a receptacle used between right and left seats adjacent to each other in vehicles such as automobiles and trains, ships, airplanes, or in theaters, hotels, etc.

There is a conventional receptacle having a structure disclosed in Japanese Patent Application Laid-Open No. 5-338496.

The receptacle comprises a box body, and a lid body which is capable of being opened and closed from both right-hand and left-hand sides of the box body. Thus, persons who sit on adjacent seats can take articles in and out from both right-hand and left-hand sides of the box body.

The box body is provided with bank-like portions extending right and left at front and rear portions of the box body. Right and left side portions of a lid body are interposed between the front and rear bank-like portions in a state that the lid body is closed. The right and left side portions of the lid body are individually attached with a hinge member. The hinge member is urged by means of a spring so that it is projected into front and rear directions from the front and rear end portions of the lid body.

The right and left sides of the lid body are provided with a pair of right and left operating buttons which are actuated independently from each other. Right and left hinge member are respectively connected with right and left operating buttons. These hinge members are projected into and retracted from the front and rear end portions of the lid body by actuating the operating buttons.

Right and left hinge members are projected into the bank-like portions, and are fitted into a bearing hole formed in each of right and left bank-like portions. In a state that the right and left hinge members are individually fitted into the bearing hole formed in each of right and left bank-like portions, the lid body is kept at a state of being closed (closed position).

In such a state, when one (right) operating button is pushed against an urging force of spring, one hinge member comes off from the bearing hole and is retracted into the interior of the lid body. Namely, an engagement of one hinge member with the bearing hole is released. At this time, since the other (left) hinge member is fitted into the bearing hole, the lid body is pivoted so as to be rotatable on the axis of the other hinge member. Therefore, the lid body is opened from one side by moving one side portion of the lid body to an opening direction while pushing one operating button.

In order to close the lid body, one side of the lid body is pressed into the box body side against the urging force of spring. Whereby one hinge member is again fitted into the bearing hole, and the lid body is kept at a state of being closed.

In the aforesaid state, when the other (left) operating button is pushed against the urging force of spring, the other hinge member comes off from the bearing hole and is retracted into the interior of the lid body. Namely, an engagement of one hinge member with the bearing hole is released. At this time, since the one (right) hinge member is fitted into the bearing hole, the lid body is pivoted so as to be rotatable on the axis of the one hinge member. Therefore, the lid body is opened from the other side by moving the other side portion of the lid body to an opening direction while pushing one operating button.

In order to close the lid body, the other side of the lid body is pressed into the box body side against the urging force of spring. Whereby the other hinge member is again fitted into the bearing hole, and the lid body is kept at a state of being closed.

Namely, not only the lid body can be kept at a state of being closed, but also the lid body can be opened from both right-hand and left-hand sides as the need arises.

Also, there is a stopper connecting a receptacle with a lid body (see disclosed in Japanese Utility Model Application Laid-Open Nos. 60-24657 and 60-42869). By making advantage of the stopper, the lid body can be kept at a state of being opened.

With the aforesaid construction, however, in the case where the lid body is in the state of being opened, the lid body on the opened side is in a state that its front and rear end portions are exposed. The free end portions of hinge member are projected from the exposed front and rear end portions of the lid body; for this reason, there is a problem that a person who sits on a seat catches his cloth on the free end portions of the hinge member.

Moreover, when viewing the conventional receptacle from the top, there is divided portions defined between the front and rear bank-like portions and the front and rear end portions of the lid body. Thus, in order to provide a receptacle having a preferable appearance, the lid body and the box body must be assembled so that the divisional line on the divided portions becomes parallel. For this reason, there has arisen a problem that the assembling work is very troublesome, and many man powers are required.

The aforesaid divisional line is a gap defined between the bank-like portions and the lid body. For this reason, there is a possibility that articles are caught in the gap.

The aforesaid stopper is provided in the receptacle to keep a state that the lid body is opened. The stopper has a structure in which its one side portion is a shaft; the other side portion is slidable. For this reason, there is a problem that articles are caught in a slidable portion.

SUMMARY OF THE INVENTION

The present invention has been made in view of the above problems. An object of the present invention is to provide a receptacle which has a function of capable of opening and closing a lid body from both one and the other sides of the lid body, and has neither protrusion on which clothes of a person who sits on a seat are caught nor divided portions and stoppers in which articles are caught.

To solve the above problem, the present invention provides a receptacle comprising: a box body having an opening at its upper portion; a lid body which is formed into a size capable of closing the opening; one and the other engagement parts formed in the box body; and one and the other engaged parts which are formed in the lid body and individually engage with one and the other engagement parts formed in the box body so that an engagement with the engagement parts is freely released. The lid body is kept at a state of closing the opening when one and the other engagement parts engage with one and the other engaged parts, and is rotatably opened from one side on the axis of one engagement part and one engaged part which are engaged with each other when one engagement part engages with one engaged part and the engagement of the other engagement part with the other engaged part is released, and further, is rotatably opened from the other side on the axis of the other engagement part and the other engaged part which are engaged with each other when the other engagement part engages with the other engaged part and the engagement of one engagement part with one engaged part is released. The aforesaid one and the other engagement parts are formed so as to be covered with the lid body closing said opening. The aforesaid one and the other engaged parts are formed so as not to be exposed from an exterior decor portion of the lid body.

Further, the receptacle of the present invention may be constructed wherein the box body has wall portions defining the opening, the lid body has an edge portion which is abutted against an upper edge portion of wall portion in a state that the lid body closes said opening, the engagement parts each comprise an engagement end portion projecting from the wall portion and an engagement element formed in said engagement end portion, and the engaged parts each comprises an end receiving portion which is formed at its edge portion and receives said engagement end portion in a state that the lid body is closed, and an engaged element which is provided in the edge portion and engages with the engagement element so as to be freely released.

The engagement part of box body may be provided on each of wall portions corresponding to each other.

With the above construction, the engaged parts are not exposed from the exterior decor portion of the lid body in a state that the lid body closes the opening. Also, since the engagement parts are covered with the lid body closing the opening, no divided portions is defined between the lid body and the box body when viewing the receptacle from the top. Therefore, the present invention can provide the receptacle which has a function of capable of opening and closing a lid body from one and the other sides of the lid body, and has neither protrusion on which clothes of a person who sits on a seat are caught nor divided portions and stoppers in which articles are caught.

Furthermore, the receptacle may be constructed wherein a clearance is defined between the engagement end portion and the upper face of wall portion, the edge portion has an end covering portion for covering an outside of the engagement end portion in a state that the lid body is closed, the end covering portion is fitted into the clearance and abutting against a lower end face of the engagement end portion.

With the above construction, the end covering portion is abutted against the lower end face of the engagement end portion, so that the lid body can be kept at a state of being completely opened (opened position). Namely, the lid body is kept at a state of being completely opened without separately providing a stopper mechanism having a possibility of catching articles therein.

Also, the receptacle of the present invention may be constructed wherein the engaged element of lid body is a hinge member which is provided in an inside of the edge portion so that it is freely projected into and retracted from the end receiving portion, the engagement element of box body is a bearing hole in which the hinge member projected into the end receiving portion is fitted, and the engagement end portion of box body has a stopper portion for preventing said hinge member from being projected until said hinge member is aligned in position with said bearing hole when said lid body is closed.

Further, the receptacle of the present invention may be constructed wherein the engagement part of box body is provided on each of wall portions corresponding to each other, the end receiving portion of lid body is provided on each of edge portions corresponding to each other, the engaged element of lid body is a hinge member which is provided in an inside of said edge portion so that it is freely projected into and retracted from said end receiving portion, the engagement element of box body is a bearing hole in which the hinge member projected into the end receiving portion is fitted, and the lid body has one and the other operating portions and a lock mechanism. The aforesaid one and the other operating portions are respectively connected to one and the other hinge members so that an engagement of the hinge member on the operated side with the bearing hole is released. The aforesaid lock mechanism urges one and the other hinge members so that they are projected into said end receiving portions when said lid body closes said opening while being in a lid closing state of permitting one and the other operating portions to be operated, and is transferred from the lid closing state to a lid opening and closing state of prohibiting one and the other operating portions from being operated and keeping an engagement of one and the other hinge members with the bearing hole when the lid body is opened from the operated side in a state that one or the other operating portion is operated and an engagement of the hinge member with the bearing hole on the operated side is released. Furthermore, the receptacle of the present invention may be constructed wherein the engagement end portion of box body has a stopper portion for preventing said hinge member from being projected until said hinge member is aligned in position with said bearing hole when said lid body is closed, when the lid body is closed, and then, the lock mechanism is transferred to the lid opening and closing state to the lid closing state.

With the above construction, when the lid body is closed, if a foreign matter is caught between the wall portions of box body and the edge portion of lid body and the lid is closed in a state of being deformed, a shift occurs in position between the hinge member and the bearing hole. However, the stopper portion prevents the hinge member from being projected. Thus, the hinge member is not projected in the case where the lid body is in a state of being incompletely closed. Accordingly, the hinge member can be prevented from being fitted into unexpected portions other than the bearing hole.

DESCRIPTION OF THE PREFERRED EMBODIMENTS

Figure 1:
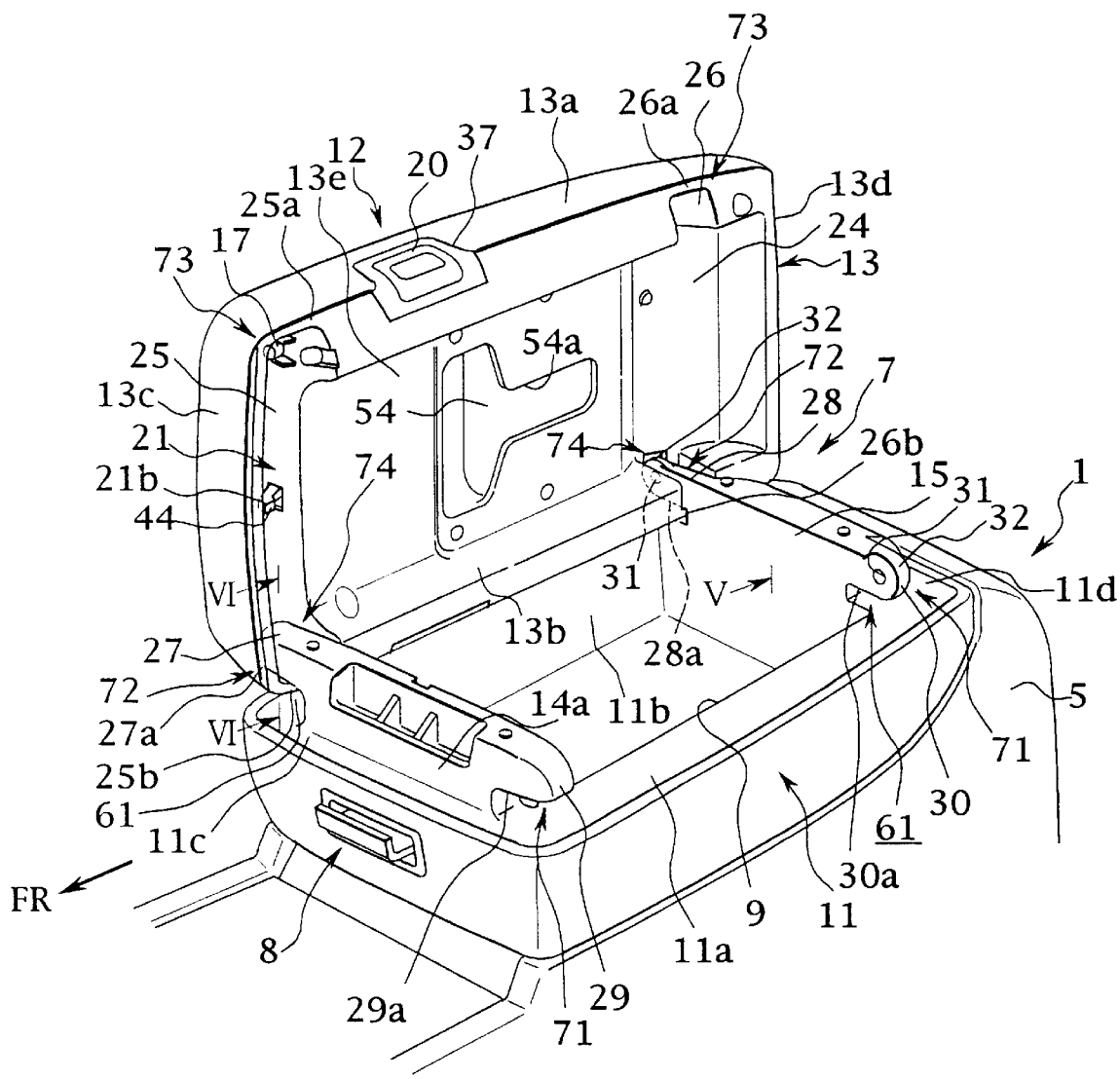
FIG. 1 is a perspective view of a receptacle according to a first embodiment of the present invention.

Embodiments of the present invention will be described below with reference to the accompanying drawings. In the following description, a right-and-left direction is indicative of a direction where a vehicle is in a state of being directed forward.

FIGS. 1 to 9 show an example of the case where a receptacle according to a first embodiment of the present invention is applied to a console box for automobiles.

A console box 1 comprises a first box body 5 and a main lid body 7 used as a receptacle.

The first box body 5 is fixed on a floor (not shown), and is formed with a first opening 3 (see FIG. 4) for taking small articles in and out at its upper portion. The first opening 3 is substantially formed into a rectangle. The main lid body 7 is connected to the first box body 5 by means of a rear hinge 6 (see FIG. 4). The main lid body 7 is transferable from a state (see FIGS. 1 and 4) of closing the first opening 3 of the first box body 5 to an opened state (not shown) of substantially vertically standing up by means of the hinge 6 (see FIG. 4). Thus, the first opening 3 covered with the main lid body 7 is opened from a front side FR. The front portion of the first box body 5 and the main lid body 7 is provided with a first lock 8. By operating the first lock 8, the main lid body 7 is selectively set to a state that it is engaged with the first box body 5, or to a state that the engagement is released.

Moreover, the main lid body 7 is divided into two upper and lower half bodies, and comprises a lower second box body 11 used as a main box and an upper lid body 13.

The second box body 11 is formed into a bottomed box shape. Further, the second box body 11 has a substantially rectangular bottom 11e which is capable of closing the first opening 3 of the first box body 5, and wall portions 11a, 11b, 11c and 11d which upward extend from the periphery of the bottom 11e. The front and rear wall portions 11a and 11b are opposites to each other, and also, right and left wall portions 11c and 11d are opposite to each other. A second opening 9 of the second box body 11 is defined by the upper edge portions of wall portions 11a, 11b, 11c and 11d, and is substantially formed into a rectangle.

The lid body 13 has a dimension capable of closing the second opening 9. Further, the lid body 13 has a substantially rectangular base portion 13e which is formed slightly larger than the second opening 9, and edge portions 13a, 13b, 13c and 13d which extend downward from the periphery of the base portion 13e. Lower faces of these edge portions 13a, 13b, 13c and 13d are abutted against upper faces of wall portions 11a, 11b, 11c and 11d in a state that the second opening 9 is covered with the lid body 13.

Figure 4:
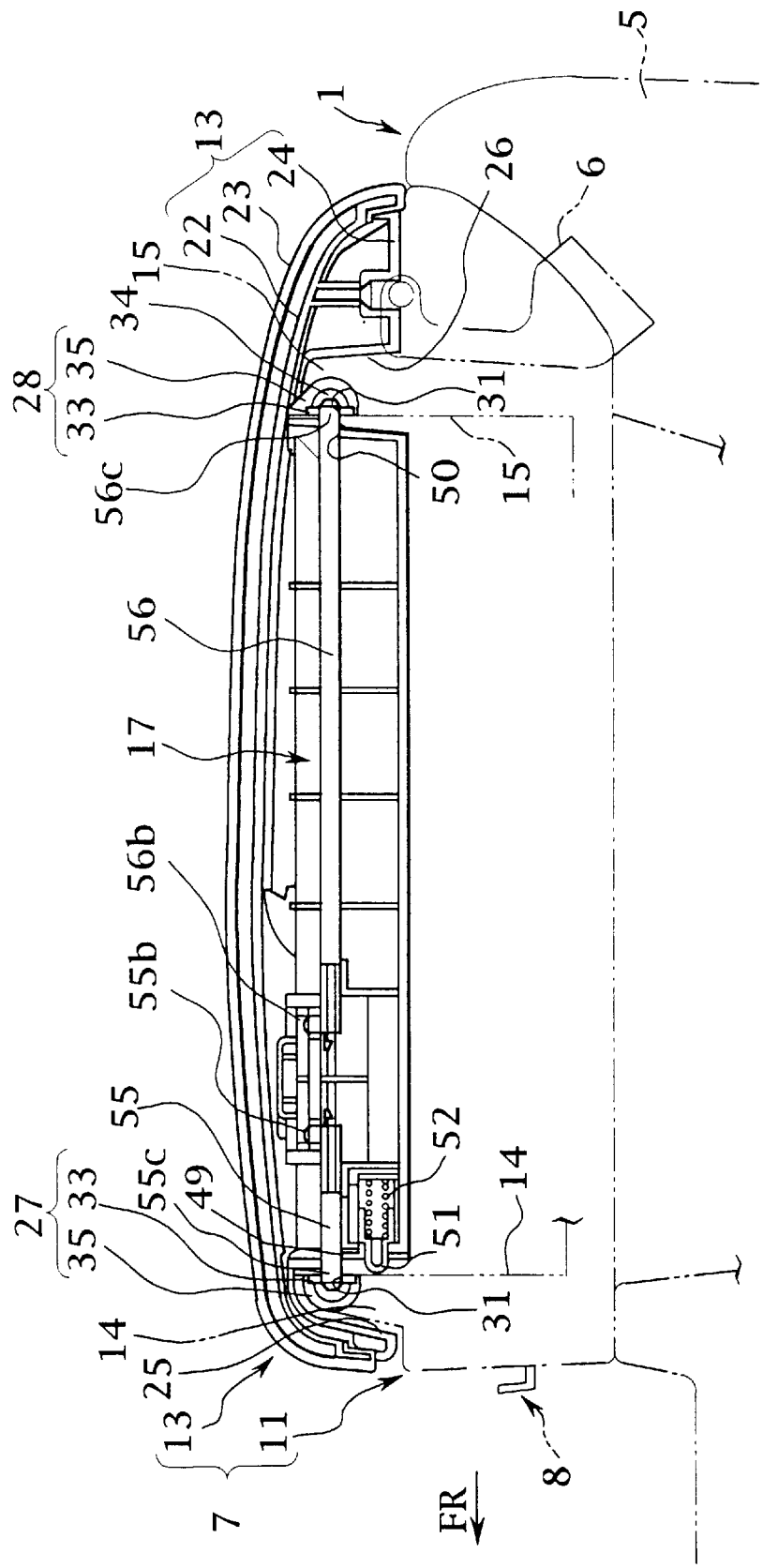
FIG. 4 is a longitudinal sectional view of FIG. 3.

As shown in FIG. 4, the lid body 13 has a three-layer structure. Specifically, the lid body 13 comprises a lid part 22 which is formed into a gentle circular-arc shape and is made of a synthetic resin, an outermost layer part 23 which is an exterior decor portion made of a cloth-like member and a flexible plastic foam covering the surface (upper face) side of the lid part 22, and an inner layer part 24 which covers the surface on the back side (lower face) of the lid part 22 and is made of a synthetic resin.

The second box body 11 is formed with engagement end portions 29;30 and a bearing hole (engagement element) 31 which constitute one (left) engagement part 71, and engagement end portions 27;28 and a bearing hole (engagement element) 31 which constitute the other (right) engagement part 72.

The lid body 13 is formed with recess portions (end receiving portion) 25;26 and a hinge member (engaged element) 17 (see FIGS. 2 and 3) which constitute one (left) engaged part 73, and recess portions (end receiving portion) 25;26 and a hinge member (engaged element) 16 (see FIGS. 2 and 3) which constitute the other (right) engaged part 74. The right and left engaged parts 74 and 73 are engaged with the right and left engagement parts 72 and 71 so that the engagement is freely released, respectively.

The right and left engagement parts 72 and 71 are covered with the lid body 13 which is in a closed state; on the other hand, the right and left engaged parts 74 and 73 is formed so as not to be exposed from the outermost layer part 23 of the lid body 13.

The lid body 13 is kept at a state of closing the second opening 9 when the right and left engagement parts 72 and 71 are engaged with the right and left engaged parts 74 and 73. When the left engagement part 71 is engaged with the left engaged part 73 and the engagement of the right engagement part 72 with the right engaged part 74 is released, the lid body 13 is rotatable on the axis of the left engagement part 71 and engaged part 73 which are engaged with each other, and then, is opened from the right-hand side. Conversely, when the right engagement part 72 is engaged with the right engaged part 74 and the engagement of the left engagement part 71 with the left engaged part 73 is released, the lid body 13 is rotatable on the axis of the right engagement part 72 and the right engaged part 74 which are engaged with each other, and then, is opened from the left-hand side (FIG. 1 shows a state that the lid body 13 is opened from the left-hand side).

In this case, the engagement of the engagement parts 71;72 with the engaged parts 73;74 is indicative of a state that both distal end portions 55c and 56c of hinge members 17 and 16 are fitted into the bearing holes 31. On the other hand, non-engagement of the engagement parts 71;72 with the engagement parts 73;74 is indicative of a state that both distal end portions 55c and 56c of hinge members 17 and 16 come off from the bearing holes 31. These distal end portion 55c and 56c of hinge members 17 and 16 will be described later.

The following is a detail explanation about a constitution of the second box body 11 and the lid body 13.

The second box body 11 is formed with protrusions 14 and 15 on the upper surface of the middle portions of the front and rear wall portions 11c and 11d. The protrusions 14 and 15 respectively project upward from the upper surface of the right and left wall portions 11a and 11b with a predetermined dimension.

Both ends of the protrusions 14 and 15 are formed with the left-side engagement end portion 29 on the front of the second box body 11 and the right-side engagement end portion 27 on the front thereof. On the other hand, both ends of the protrusions 14 and 15 are formed with the left-side engagement end portion 30 on the rear of the second box body 11 and the right-side engagement end portion 28 on the rear thereof. The rear-side engagement end portions 28 and 30 are arranged in a state of being separated from the front-side engagement end portions 27 and 29 in the front and rear direction. These engagement end portions 27 to 30 are each situated on four corners of the second box body 11. Further, each of these engagement end portions 27 to 30 projects into a peninsular shape from the protrusions 14 and 15 so that their distal end portions is situated on opposite end portions of right and left wall portions 11a and 11b.

Each of facing engagement end portions 27 and 28 is formed with the bearing hole (engagement element) 31, and also, each of facing engagement end portions 29 and 30 is formed with the bearing hole (engagement element) 31. Hinge members 16 and 17 (see FIGS. 2 and 3) are fitted into the bearing hole 31.

As shown in FIG. 4, each of engagement end portions 27 to 30 has a plate 33 which is formed with the bearing hole 31, and a cover part 35. The cover part 35 has a shape of C in its cross section, and is formed with a space 34 which is capable of receiving hinge members 16 and 17 held between the upper and lower end portions of the plate 33.

As shown in FIG. 1, each of edge portions 13a and 13b of the lid body 13 is formed with recess portions 25 and 26 for receiving protrusions 14 and 15 (engagement end portions 27 to 30) projecting upward from the second opening 9 when the lid body 13 is closed. These recess portions 25 and 26 are formed integrally with the inner layer part 24 of the lid body 13. In the edge portions 13a and 13b, both right and left sides of each of recess portions 25 and 26 constitute end covering portions 25a, 26a, 25b and 26b for covering right and left portions of respective engagement end portions 27 to 30 of the second box body 11 when the lid body 13 is closed.

A clearance 61 is defined between each of engagement end portions 27 to 30 of the second box body 11 and the upper face of respective right and left wall portions 11a and 11b.

When the lid body 13 is opened from one side (the left-hand side), the end covering portions 25b and 26b of the other side (the right-hand side) which becomes a lower end of the lid body 13 are respectively fitted into the clearance 61 between engagement end portion 27 and the wall portion 11b and the clearance 61 between engagement end portion 28 and the wall portion 11b. And then, these end covering portions 25b and 26b are abutted against the lower faces 27a and 28a of engagement end portions 27 and 28, respectively (see FIG. 6). Also, when the lid body 13 is opened from the other side (the right-hand side), the end covering portions 25a and 26a of the other side (the left-hand side) which becomes a lower end of the lid body 13 are respectively fitted into the clearance 61 between engagement end portion 29 and the wall portion 11a and a clearance 61 between engagement end portion 30 and the wall portion 11a. And then, these end covering portions 25b and 26b are abutted against the lower faces 29a and 30a of engagement end portions 29 and 30, respectively. The end portions of covering portions 25b and 26b are abutted against the lower faces of engagement end portions 27 and 28, so that the lid body 13 can be kept in an opened state.

As shown in FIG. 4, the lid body 13 is provided with a coil spring 52, and a boss 51 which is urged to the projecting direction by means of the coil spring 52. The boss 51 is arranged so that it can be held between two rib-like stoppers 53 (see FIG. 5). The two rib-like stoppers are formed in the front and rear wall portions 11c and 11d in a state of being slightly separated from each other.

When the lid body 13 is opened, and then, end covering portions 25a, 26a, 25b and 26b are fitted into the clearance 61 and abutted against the lower faces 29a, 30a, 27a and 28a of engagement end portions 29, 30, 27, and 28, the boss 51 is urged to the projecting direction by means of the coil spring 52, and then, is held between two rib-like stoppers 53. Therefore, the lid body 13 can be securely kept in an opened state.

Figure 2:
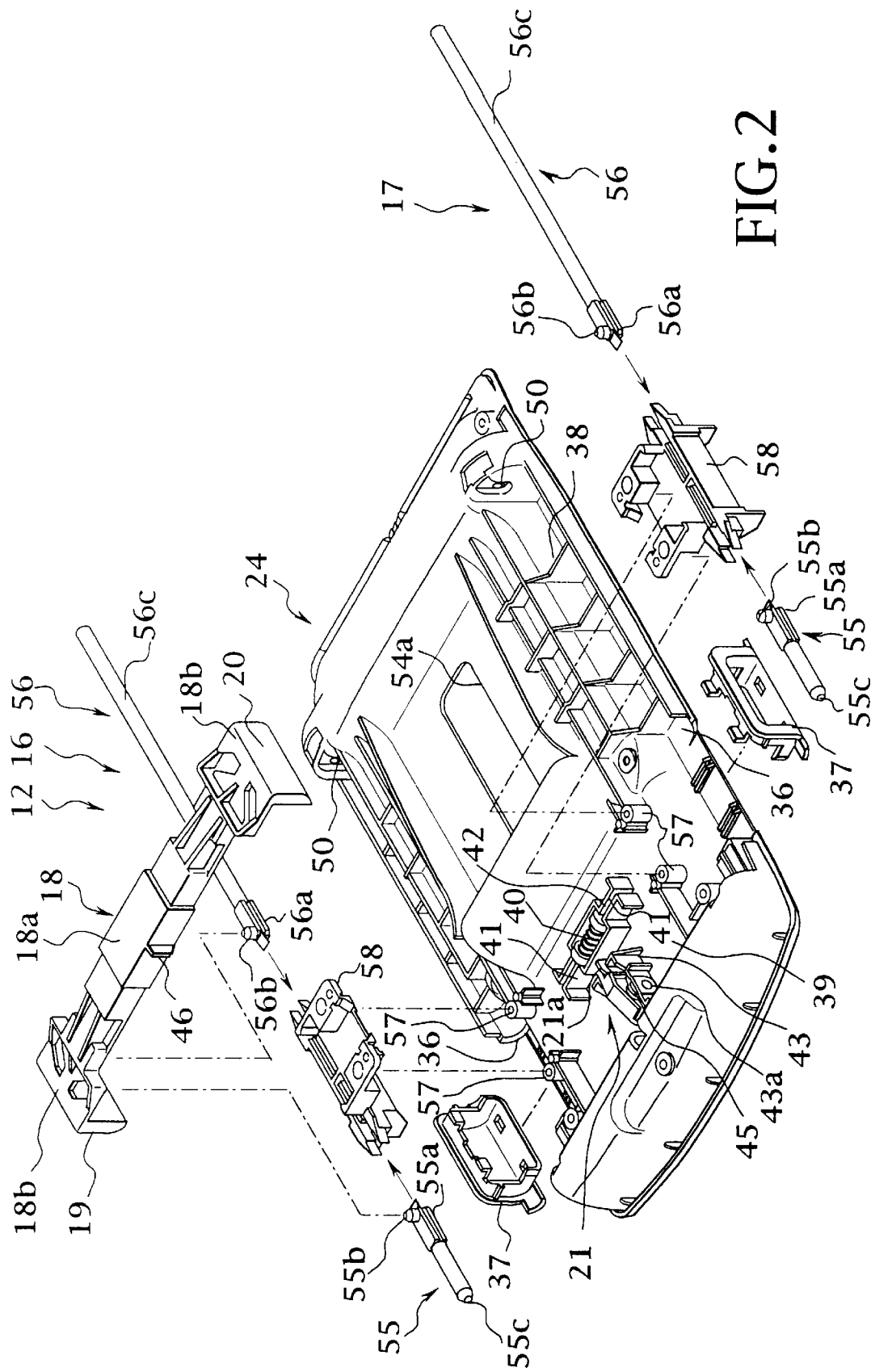
FIG. 2 is an exploded perspective view showing a second lock device and an inner layer part of a lid body.
Figure 3:
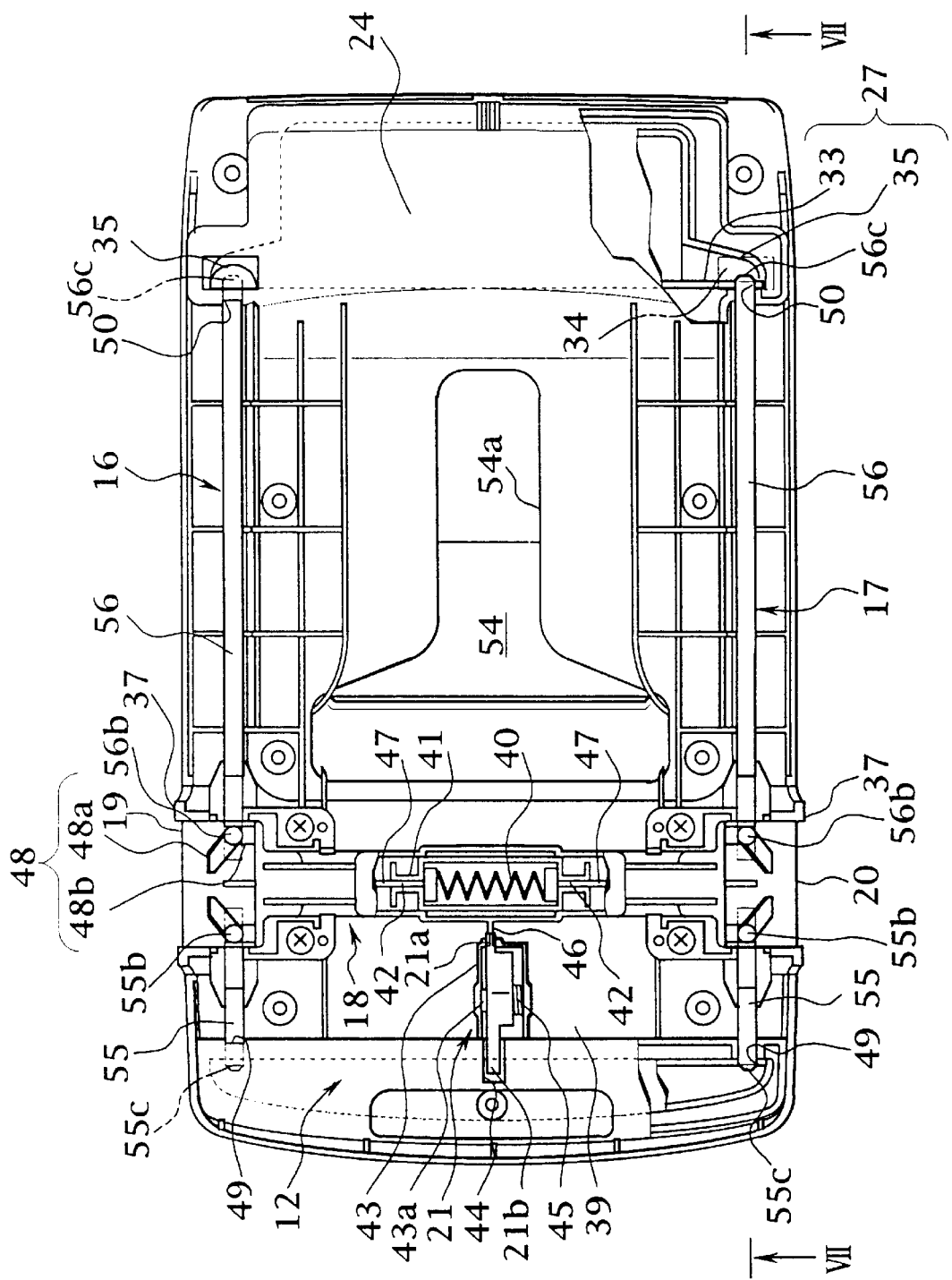
FIG. 3 is a plan sectional view showing the lid body when the second lock device is in a state of closing the lid body.

As shown in FIGS. 2 and 3, each of hinge members 16 and 17 comprises a shorter round rod-like hinge pin 55, a longer round rod-like hinge pin 56 and a base member 58. Each of proximal portions 55a and 56a of hinge pins 55 and 56 is pivoted on the base member 58 so as to be slidable in front and rear. The base member 58 is supported on bosses 57;57 of the inner layer part 24 which will be described later.

Hinge pins 55 and 56 have respectively driven pins 55b and 56b projecting from the proximal portions 55a and 56a, and distal end portions 55c and 56c which extend to the side opposite to proximal portions 55a and 56a and fitted into or come off from the bearing hole 31.

The lid body 13 is provided with a second lock device 12 which has right and left operating buttons 20 and 19. The second lock device 12 function as a lock mechanism for one and the other operating portions.

Right and left operating buttons 19 and 20 are connected with hinge members 17 and 16 and the second lock device 18. When either of the right and left operating buttons 19 and 20 is pushed by a person who sits on a seat, either of the buttons is retracted into the lid body 13. Then, distal end portions 55c and 56c of hinge members 17 or 16 on the side where the button is pushed, are retracted into the lid body 13. Thus, the distal end portions 55c and 56c of hinge members 17 or 16 on the side where the button is pushed, come off from the bearing hole 31 (see FIG. 4).

The second lock device 12 is in a state of closing the lid body when the lid body 13 is in a closed state. When either of right and left operating buttons 20 and 19 is pushed from the state of closing the lid body, the lid body 13 is opened from the side where the button is pushed, and is transferred to a state of opening and closing the lid body.

When the lid body is in a closed state, right and left operating buttons 19 and 20 are in a retractable state when being pushed, and distal end portions 55c and 56c of either right or left hinge member 17 or 16 are projected into recess portions 25 and 26 of the second box body 11, and are urged so as to be fitted into the bearing hole 31 (see FIG. 4).

When the left operating button 20 is pushed in a state that the lid body is closed, the distal end portions 55c and 56c of the left hinge member 17 come off from the bearing hole 31, the lid body 13 is opened from the left-hand side. When the lid body 13 is further opened, the second lock device 12 is in a first lid opening and closing state.

In the first lid opening and closing state, both right and left operating buttons 20 and 19 can not be pushed. And then, distal end portions 55c and 56c of the left hinge member 17 (the side where the button is pushed) are kept at a state of being not projected into recess portions 25 and 26, while distal end portions 55c and 56c of the right hinge member 16 (the side where the button is not pushed) are kept at a state of being projected into recess portions 25 and 26.

Likewise, when the right operating button 19 is pushed in a state that the lid body is closed, and the lid body 13 is opened from the right-hand side, the second lock device 12 is in a second lid opening and closing state.

In the second lid opening and closing state, both right and left operating buttons 20 and 19 can not be pushed. And then, distal end portions 55c and 56c of the right hinge member 16 (the side where the button is pushed) are kept at a state of being projected into recess portions 25 and 26, while distal end portions 55c and 56c of the left hinge member 17 (the side where the button is not pushed) are kept at a state of being not projected into recess portions 25 and 26.

Next, the following is a detailed explanation about a construction of the second lock device.

As shown in FIG. 2, the second lock device 12 generally comprises a movable member 18 for moving hinge pins 55 and 56 of respective hinge members 16 and 17, and a check lever 21 which is engaged with the protrusion 14 formed on the front wall portion 11c and is removable therefrom.

The movable member 18 is a plate-like integral molding product made of a synthetic resin, and has a narrow-width center portion 18a and a wide-width opposite end portions 18b; 18b has integrally a pair of the right and left operating buttons 20 and 19.

In the upper portion of the inner layer part 24 in the lid body 13, there is defined a space 39 for mounting the movable member 18 so that it is movable in right and left directions. Both side portions of the space 39 are formed with notch portions 36. These notch portions 36 are attached with decor members 37;37 for supporting operating buttons 19 and 20 so that they are projected or retractable. Also, the inner layer part 24 is properly formed with a reinforcement rib 38.

As shown in FIG. 4, in the inner layer part 24, a support hole 49 is formed at a portion which constituting a backward inner face of the front-side recess portion 25; on the other hand, a support hole 50 is formed at a portion which constituting a forward inner face of the rear-side recess portion 26. These support holes 49 and 50 are individually formed at a position which is substantially coaxial with the bearing hole 31 when the lid body 13 is in a closed state. Right and left hinge members 16 and 17 are respectively provided in right and left edge portions 13a and 13b so that their distal end portions 55c and 56c are projected into the recess portions 25 and 26 penetrating through the support holes 49 and 50 and are fitted into and come off from the bearing hole 31. In FIG. 4, there is shown a construction of the left hinge member 17. The right hinge member 16 has the same construction as the left hinge member 17.

As shown in FIG. 3, the mounting space 39 is formed with retaining blocks 41 and 41;41 having a slight gap 42 defined in front and rear. A compression coil spring 40 is received in the gap 42 between the retaining blocks 41 and 41. The compression coil spring 40 urges the movable member 18 so that the member is kept at the substantially center position of the right-and-left direction.

In the mounting space 39, moreover, a beak-like check lever 21 (see FIG. 7) is rotatably pivoted by means of a pin 43a of a support member 43 projecting from the inner layer part 24.

Figure 7:
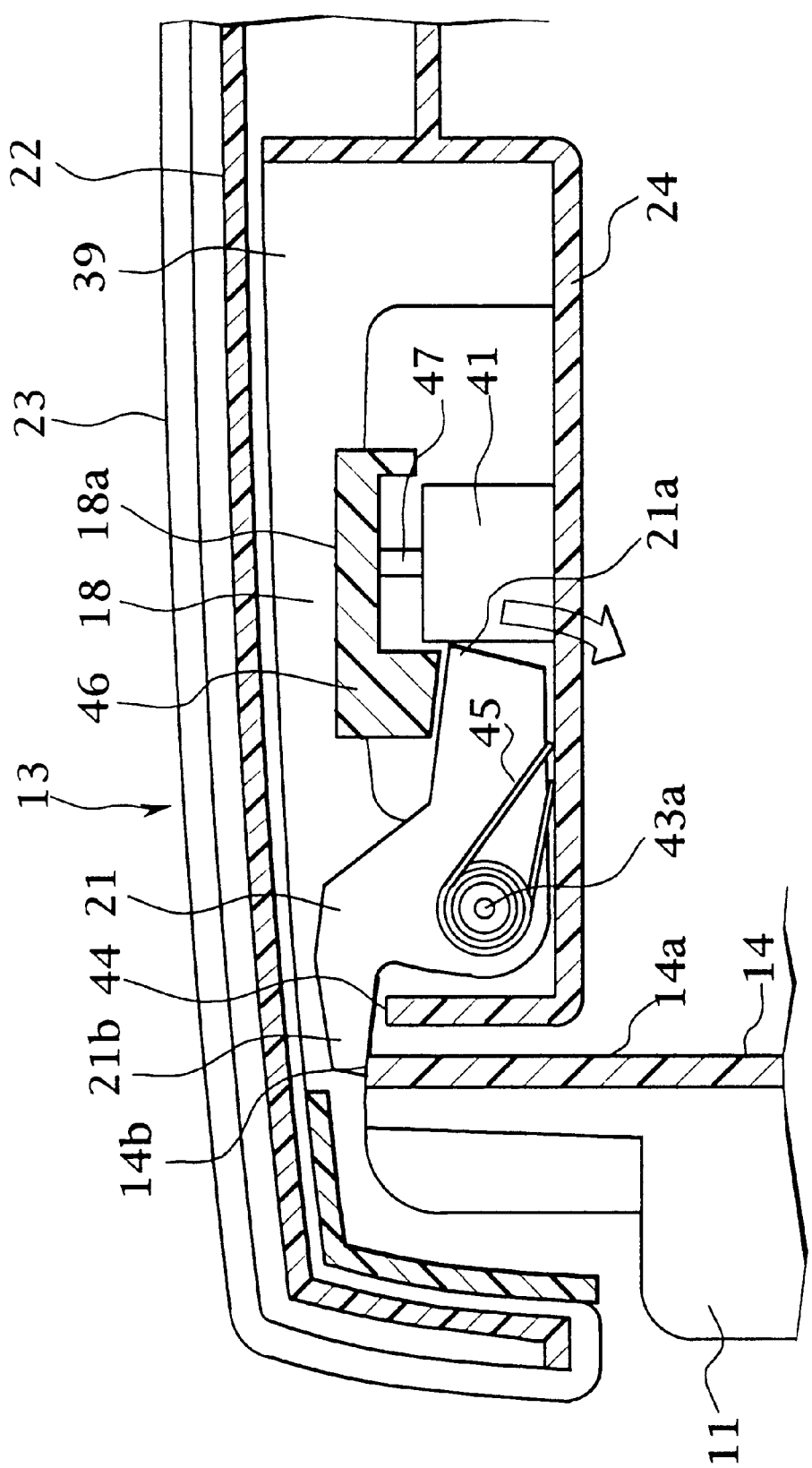
FIG. 7 is a cross sectional view of principal parts cut along the line VII—VII of FIG. 3.

As shown in FIGS. 1 and 7, one end portion 21a of the check lever 21 faces the retaining block 41 side; the other end portion 21b thereof extends outward through a notch 44 formed at the front-side recess portion 25 of the inner layer part 24. The other end portion 21b of the check lever 21 is urged by means of a torsion spring 45 supported by the pin 43a so that it is abutted against the lower end of the notch 44.

As shown in FIGS. 2 and 3, the front face of the center portion 18a of the movable member 18 is formed with a stopper protrusion 46. Further, the lower portion of the movable member 18 is formed with a pair of leg portions 47 which closely contacts with a compression coil spring 54 through the gap 42 between the retaining blocks 41 and 41.

Both sides 18b;18b of the movable member 18 are formed with a pair of cam grooves 48. Each of the cam grooves 48 is composed of reverse V-like regulating portions 48a and parallel non-regulating portions 48b. The distance between the regulating portions 48a is gradually widened toward the inside of the lid body 13; on the other hand, the non-regulating portions 48b connect with the innermost side of regulating portions 48a when the distance between regulating portions 48a becomes the maximum. The driven pins 55a and 56a of hinge pins 55 and 56 of the hinge members 16 and 17 are fitted into the cam grooves 48.

As shown in FIG. 7, when the lid body 13 is closed, the other end portion 21b of the check lever 21 is butted against the upper end face 14a of the front-side protrusion 14 and is pressed upward. Then, the check lever 21 is rotated on the axis of the pin 43a against an urging force of the torsion spring 45, and the other end portion 21a of the check lever 21 is moved downward as shown by an outline arrow. Subsequently, the one end portion 21a of the check lever 21 is moved up to a position where it does not interfere with the stopper protrusion 46. Whereupon the movable member 18 is situated on the center position of the right and left direction by means of an urging force of the compression coil spring 40 while being movable in right and left with respect to the stopper protrusion 46, as shown in FIG. 3. As a result, driven pins 55b and 56b of respective right and left hinge members 16 and 17 are situated on the non-regulating portions 48b of the cam groove 48, while distal end portions 55c and 56c of respective right and left hinge members 16 and 17 being urged so as to fitted into the bearing hole 31 (see FIG. 4). In this manner, the lid body 13 is kept at a state of being closed.

For example, when the left operating button 20 is pushed from the state that the lid body is closed, the movable member 18 is moved to the right-hand side. At this time, the driven pins 55b and 56b of the left hinge member 17 are moved to the regulating portions 48a of the cam groove 48; on the other hand, the driven pins 55b and 56b of the right hinge member 16 are moved to the interior of non-regulating portions 48b of the cam groove 48. For this reason, the distal end portions 55c and 56c of the right hinge member 16 are individually projected into the recess portions 25 and 26, and are fitted into the bearing hole 31. In such a state, the distal end portions 55c and 56c of the left hinge member 17 are retracted and come off from the bearing hole 31. Thus, the lid body 13 is opened from the left-hand side on the axis of the right hinge member 16. And then, when the lid body 13 is further opened in the state that the left operating button 20 is bushed, the second lock device 12 is in a first lid opening and closing state.

Figure 9:
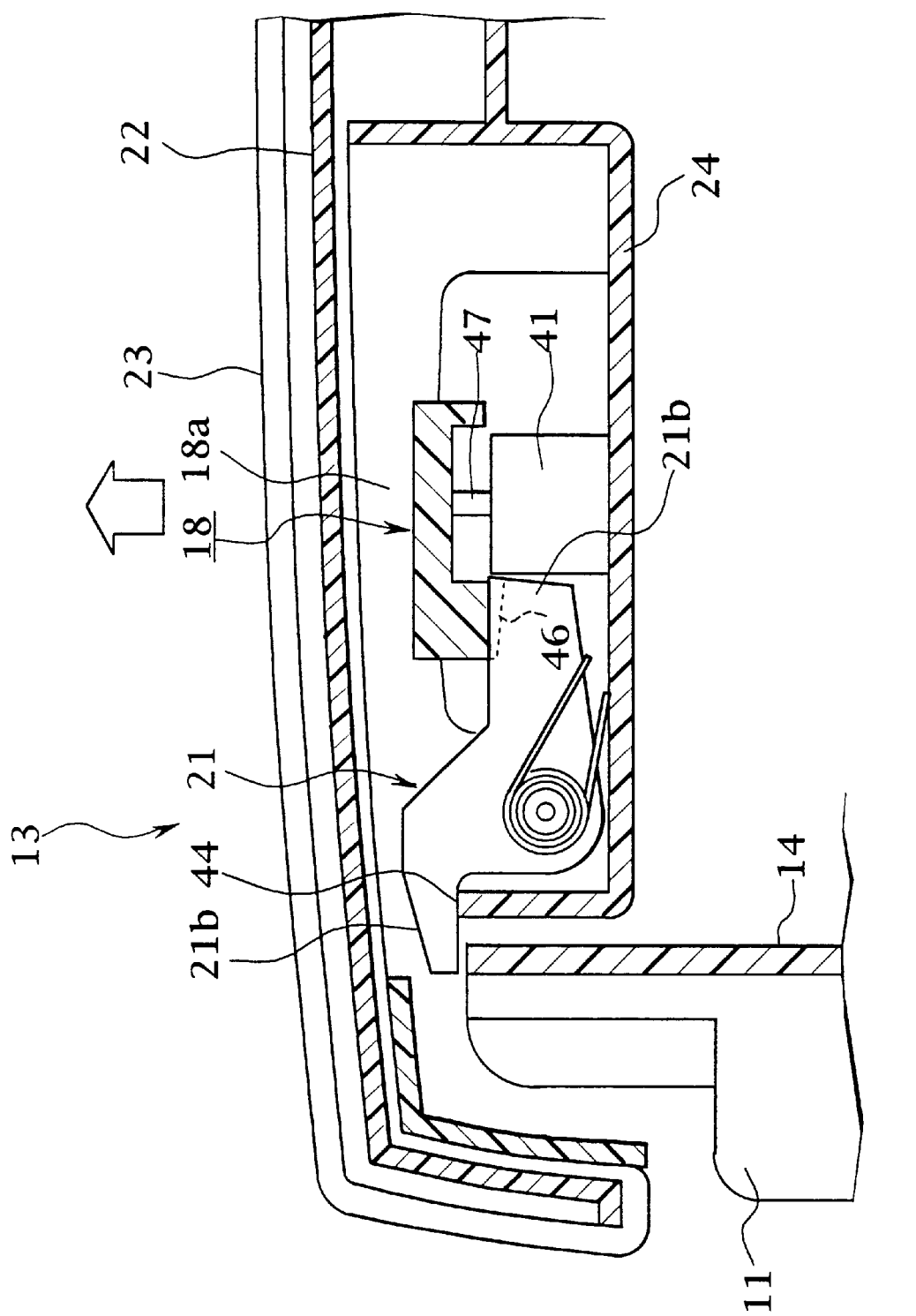
FIG. 9 is a cross sectional view of principal parts cut along the line IX—IX of FIG. 8.

In the first lid opening and closing state, as shown in FIG. 9, the one end portion 21a of the check lever 21 is urged by the torsion spring 45, and is moved up to a position capable of interfering with the stopper protrusion 46. At this time, since the movable member 18 is moved to the right-hand side, the one end portion 21a of the check lever 21 is situated on the right-hand side from the stopper protrusion 46. Therefore, the stopper protrusion 46 and the one end portion 21a of the check lever 21 interfere with each other, so that the movable member 18 can not be moved to the left-hand side. As a result, the left operating button 20 is kept at a state of being retracted when it is pushed, while the right operating button 19 is kept at a state of being not retracted when it is pushed. Namely, the right and left operating button 19 and 20 are in a state that their operations are prohibited by means of the second lock device 12. Also, the distal end portions 55c and 56c of the right hinge member 16 are kept at a state of being fitted into the bearing hole 31; on the other hand, the distal end portions 55c and 56c of the left hinge member 17 are kept at a state of coming off from the bearing hole 31.

When the right operating button 20 is pushed from a state the lid body is closed, the movable member 18 is moved to the left-hand side, the distal end portions 55c and 56c of the left hinge member 17 are kept at a state of being fitted into the bearing hole 31; on the other hand, the distal end portions 55c and 56c of the right hinge member 16 are kept at a state of being retracted and coming off from the bearing hole 31. Therefore, the lid body 13 is opened from the right-hand side on the axis of the left hinge member 17. When the lid body 13 is opened while pushing the right operating button 190, the second lock device 12 is in a second lid opening and closing state.

In the second lid opening and closing state, the movable member 18 is moved to the left-hand side, the one end portion 21a of the check lever 21 is situated on the left-hand side from the stopper protrusion 46. Therefore, the stopper protrusion 46 and the one end portion 21a of the check lever 21 interfere with each other, so that the movable member 18 can not be moved to the right-hand side. As a result, the right operating button 19 is kept at a state of being retracted when it is pushed, while the left operating button 20 is kept at a state of being not retracted when it is pushed. Namely, the right and left operating button 19 and 20 are in a state that their operations are prohibited by means of the second lock device 12. Also, the distal end portions 55c and 56c of the left hinge member 17 are kept at a state of being fitted into the bearing hole 31; on the other hand, the distal end portions 55c and 56c of the right hinge member 16 are kept at a state of coming off from the bearing hole 31.

The following is an detailed explanation about a construction of rear engagement end portions 28 and 30.

Figure 5:
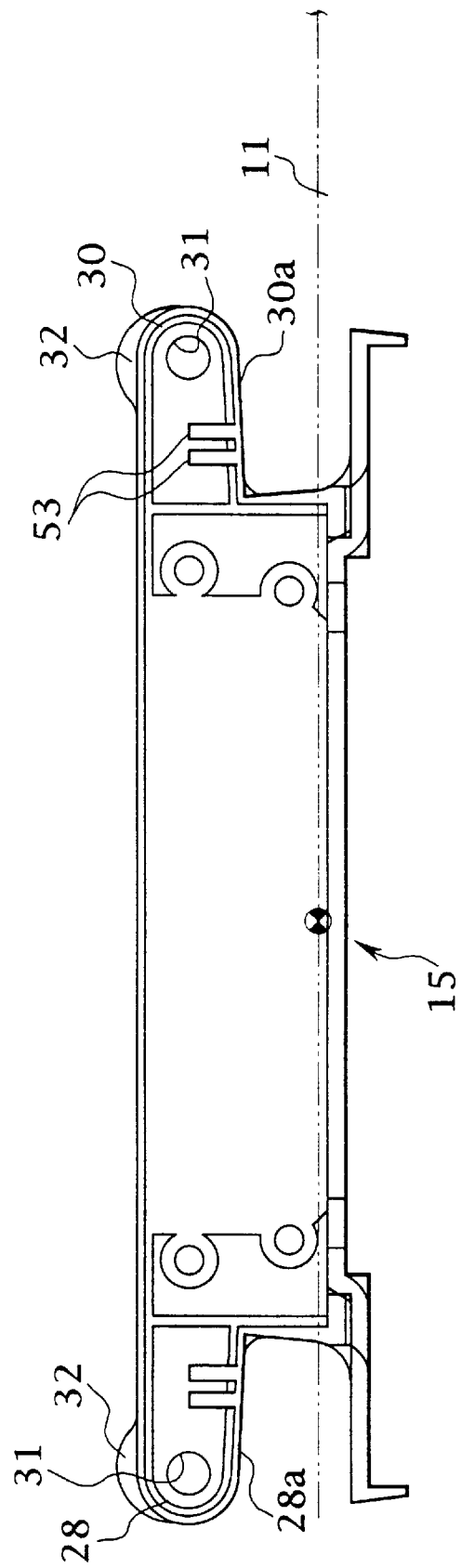
FIG. 5 is a explanatory view when viewing FIG. 1 from the direction shown by an arrow V.
Figure 6:
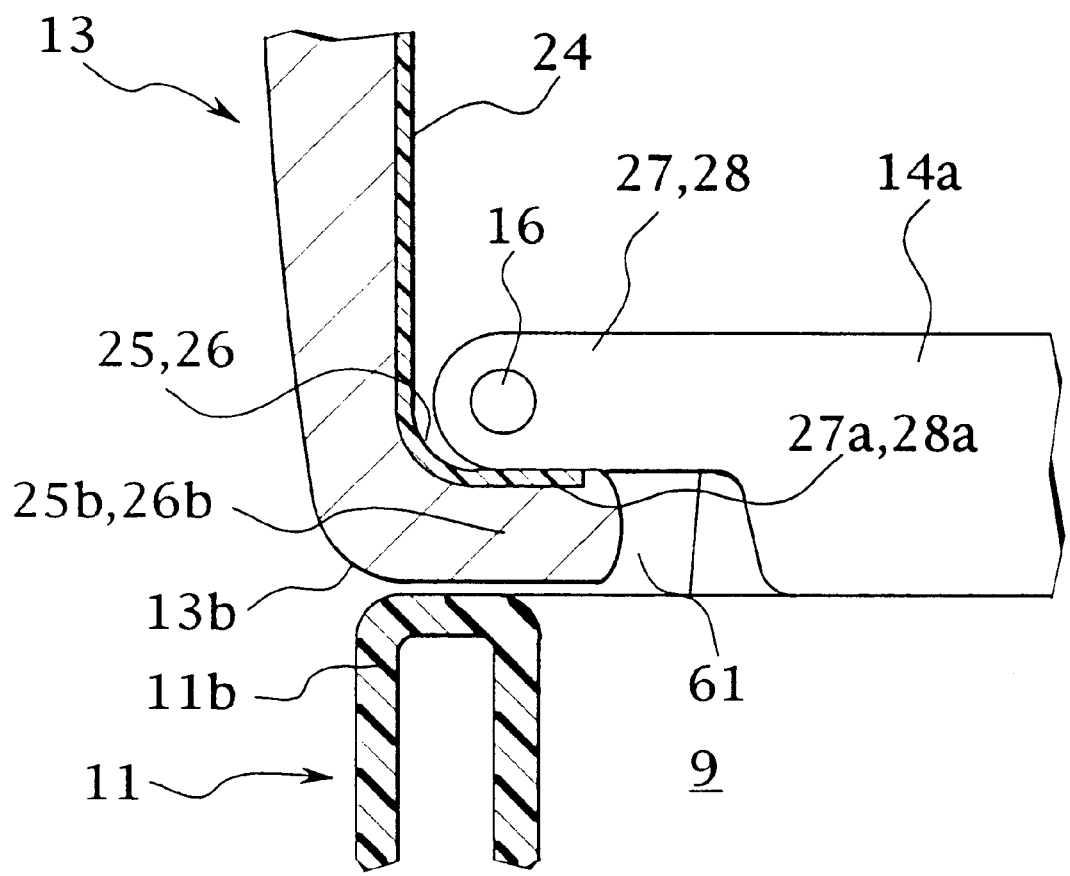
FIG. 6 is a cross sectional view cut along the line VI—VI of FIG. 1.

As shown in FIG. 5, each of rear engagement end portions 28 and 30 are formed with a semi-spherical protruded stopper 32 at its upper portion. The semi-spherical protruded stopper 32 is projected about 3 millimeters higher than each of engagement end portions 28 and 30, and is formed into a circular arc which is substantially concentric with the center of bearing hole 31.

When the lid body 13 in the lid opening and closing state is transferred to a closed state, the stopper 32 prevents the distal end portions 56c of hinge members 16 and 17 from being projected into a recess portion 50 until the distal end portions 56c of hinge members 16 and 17 are aligned in position with the bearing hole 31.

Also, as shown in FIG. 1, the inner layer part 24 of the lid body 13 is formed with a receiver portion 54 for receiving a tissue paper box (not shown). The receiver portion 54 has a notched widow 54a for drawing out tissue paper from the received tissue paper box.

According to the construction of the first embodiments described above, when the lid body 13 closes the second box body 11, and the second lock device 12 is transferred from the lid opening and closing state to the lid closing state, first, as shown in FIG. 7, the other end portion 21b of the check lever 21 is abutted against the upper face 14a of the front-side protrusion 14, and is lifted up. Whereupon the one end portion 21a of the check lever 21 is pressed downward on the axis of the pin 43a against an urging force of the torsion spring 45. And then, the upper portion of the one end portion 21a of the check lever 21 is moved up to a position where it does not interfere with the stopper protrusion 46. As shown in FIG. 3, whereby the movable member 18 is situated on the center of the right and left direction of the lid body 13 by means of the compression coil spring 40.

Then, when the movable member 18 is moved to the center position of the right and left direction, driven pins 55b and 56b situated on the regulating portions 48a of the cam groove 48 are moved to the side of the non-regulating portions 48b of the movable member 18, the distal end portions 55c and 56c of hinge pins 55 and 56 of right and left hinge members are fitted into the bearing hole 31. Whereby the lid body 13 is kept at a state of closing the second box body 11 (lid closed state).

Figure 8:
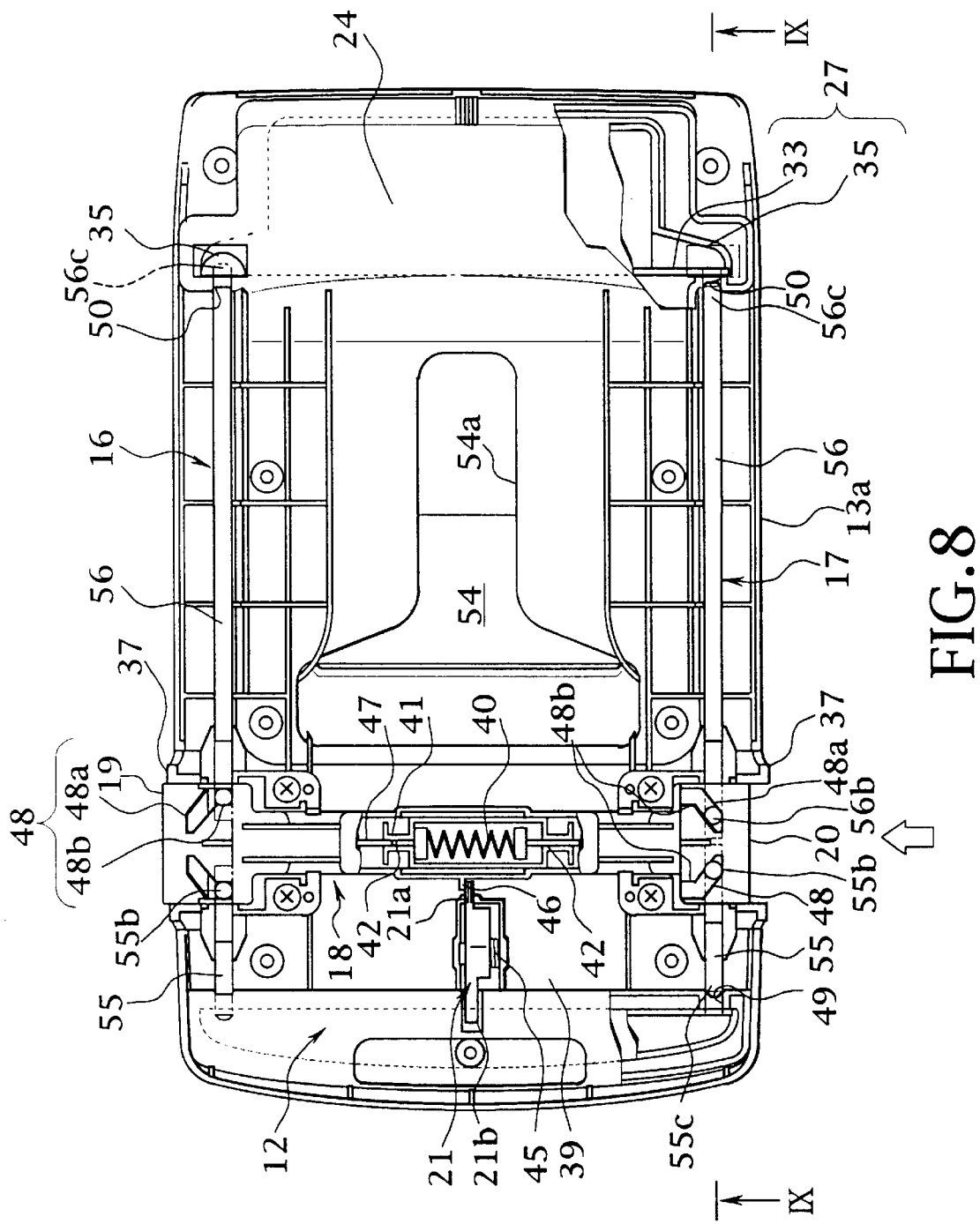
FIG. 8 is a plan sectional view showing the lid body when the second lock device is in a state of opening and closing the lid body.

Next, for example, in the case where the lid body 13 is opened from the left-hand side in the aforesaid lid closed state, the left operating button 20 is pushed toward the right direction (shown by an arrow of FIG. 8), as shown in FIG. 8. When the operating button 20 is pushed, the stopper protrusion 46 of the movable member 18 is moved to the right-hand side (upward in FIG. 8) together with the movable member 18.

When the movable member 18 is moved to the right-hand side, cam grooves 48 formed on the both sides 18b of the movable member 18 are moved to the right-hand side, while movement of driven pins 55b and 56b of hinge pins 55 and 56 fitted into the cam grooves 48 differs in right and left hinge members 16 and 17.

More specifically, driven pins 55b and 56b of hinge pins 55 and 56 of the left hinge member are guided from the non-regulating portions 48b of the cam groove 48 to the regulating portions 48a along an inclination of the regulating portion. For this reason, the hinge pins 55 and 56 of the left hinge member 17 are respectively moved in front and rear, so that the distal end portions 55c and 56c of hinge pins 55 and 56 of the left hinge member come off from the bearing hole 31.

On the contrary, the driven pins 55a and 56a of hinge pins 55 and 56 of the right hinge member is not move because they are situated in the non-regulating portions 48b of the right cam groove 48. Therefore, the distal end portions 55c and 56c of hinge pins 55 and 56 of the right hinge member 16 does not come off from the bearing hole 31.

Thus, the lid body 13 is transferred to the state as shown in FIG. 1 by lifting up the left edge portion 13a of the lid body 13 (the pushed operating button 20 side) and by opening the lid body 13.

When the lid body 13 is opened from the left-hand side, the second lock device 12 is transferred to the first lid opening and closing state.

More specifically, the other end portion 21b of the check lever 21 is separated from the upper face 14a of the front-side protrusion 14 pressing the one end portion 21a of the check lever 21, so that the one end portion 21a of the check lever 21 is lifted above the lower face of the stopper protrusion 46 by means of the torsion spring 45, as shown in FIG. 9. Even if an urging force is generated in a direction of returning the movable member 18 to the original position by means of the compression coil spring 40, the stopper protrusion 46 of the movable member 18 interferes with the side face of the other end portion 21a of the check lever 21, so that the movable member 18 is prevented from being returned. Whereby the driven pins 56b guided in the regulating portions 48a are not returned to the non-regulating portions 48b side, so that the operation of opening the lid body 13 can be easily and securely achieved.

If the right operating button 19 is pushed in error in a stage as shown in FIG. 8, that is, in a state that the operating button 20 is pushed and the movement of movable member 18 is prevented by the side face of the one end portion 21a of the check lever 21, the stopper protrusion 46 of the movable member 18 interferes with the side face of the one other end portion 21a of the check lever 21, so that the movement of the movable member itself can be prevented. Therefore, the movable member 18 is not moved even if the operating button 19 is pushed in error, so that an erroneous operation can be prevented.

The above description has shown the case where the lid body 13 is opened from the left-hand side. In the case where the lid body 13 is opened from the right-hand side, the term "right" used in the above description may be read as "left", and the term "left" used therein may be read as "right".

When both operating buttons 19 and 20 are pushed at the same time in the lid closed state, both distal end portions 55c and 56c of hinge pins 55 and 56 simultaneously come off from the bearing hole 31, so that the lid body 13 itself can be removed from the second box body 11.

As described above, according to the present embodiment, in the state that the lid body 13 is opened, recess portions 25 and 26 and hinge members 16 constituting engaged parts 73 and 74 and the second lock device 12, are not exposed from the inner layer part 23 of the lid body 13. Moreover, engagement end portions 27 to 30 and bearing holes 31 constituting engagement parts 71 and 72, are covered by the lid body 13 which is in the closed 30 state. Therefore, when viewing the main lid body 7 from the top, no divided portion is formed between the lid body 13 and the second box body 11. Thus, the lid body 13 can be opened and closed from both right-hand and left-hand sides. Moreover, neither protrusion nor divided portions is formed in the lid body; therefore, when a person sat on a seat, there is no protrusion on which the person's clothes are caught, and there is no divided portions between which articles are caught.

Also, end covering portions 25a and 26a or 25b and 26b are abutted against the lower faces of the engagement end portions 29 and 30 or 27 and 28. By doing this, the lid body 13 is kept at an opened state. Namely, the lid body 13 can be kept at an opened state without separately providing a stopper mechanism having a possibility of catching articles therein.

When the opened lid body 13 is transferred to a state of being closed, the second lock device 12 is in the lid closing state, and the movable member 18 is returned to the center position of the right and left direction by means of the urging force of compression coil spring 40 while the distal end portions 55c and 56c of hinge pins 55 and 56 of both right and left hinge members are inserted into the bearing holes 31. Therefore, the lid body 13 is fixed onto the second box body 11.

When the lid body 13 is closed, if a foreign matter and the like are held between wall portions 11a, 11b, 11c and 11d and edge portions 13a, 13b, 13c and 13d, the lid body 13 is in a state of being incompletely closed; for this reason, a shift occurs in position between the distal end portion 56c of the hinge member 16 or 17 and the bearing hole 31. In such incomplete lid closing state, if the front side of the lid body 13 is pressed in error, the front side of the lid body 13 is deformed and closed. And then, the second lock device 12 is transferred from the lid opening and closing state to the lid closing state, and the hinge member 16 or 17 is urged to the projecting direction by means of the compression coil spring 40. However, in the case where the aforesaid shift occurs in position between the distal end portion 56c of the hinge member 16 or 17 and the bearing hole 31, the distal end portion 56c of the hinge member 16 or 17 is prevented from being projected by means of the stopper portion 32. Thus, the distal end portion 56c of the hinge member 16 or 17 is not projected in the case where the lid body 13 is in a state of being incompletely closed. Accordingly, the distal end portion 56c of the hinge member 16 or 17 can be prevented from being inserted into unexpected portions other than the bearing hole 31.

What is claimed is:

1. A receptacle comprising:

a box body having an opening at its upper portion;

a lid body capable of closing said opening;

one and another engagement parts formed in said box body; and one and another engaged parts which are formed in said lid body and individually engage with said one and the other engagement parts formed in said box body so that an engagement with said engagement parts is freely released;

said lid body being kept in a closed state of said opening when said one and the other engagement parts engage with said one and the other engaged parts, and being rotatably opened from one side on the axis of said one engagement part and said one engaged part which are engaged with each other when said one engagement part engages with said one engaged part and an engagement of the other engagement part with the other engaged part is released, and being rotatably opened from the other side on the axis of the other engagement part and the other engaged part which are engaged with each other when said other engagement part engages with said other engaged part and the engagement of said one engagement part with said one engaged part is released;

said one and the other engagement parts being formed so as to be covered with said lid body closing said opening; and said one and the other engaged parts being unexposed from an exterior decor portion of said opened lid body.

2. The receptacle according to claim 1, wherein said box body has wall portions defining said opening, said lid body has an edge portion which is abutted against an upper edge portion of wall portion in a state that said lid body closes said opening, said engagement parts each comprise an engagement end portion projecting from said wall portion and an engagement element formed in said engagement end portion, and said engaged parts each comprises an end receiving portion which is formed at its edge portion and receives said engagement end portion in a state that said lid body is closed, and an engaged element which is provided in said edge portion and engages with said engagement element so as to be freely released.

3. The receptacle according to claim 2, wherein a clearance is defined between said engagement end portion and the upper face of wall portion, said edge portion has an end covering portion for covering an outside of said engagement end portion in a state that said lid body is closed, said end covering portion being fitted into said clearance and being abutted against a lower end face of said engagement end portion.

4. The receptacle according to claim 2, wherein said engaged element of lid body is a hinge member which is provided in an inside of said edge portion so that it is freely projected into and retracted from said end receiving portion, said engagement element of box body is a bearing hole in which the hinge member projected into said end receiving portion is fitted, said engagement end portion of box body has a stopper portion for preventing said hinge member from being projected until said hinge member is aligned in position with said bearing hole when said lid body is closed.

5. The receptacle according to claim 2, wherein said engagement part of box body is provided on each of wall portions corresponding to each other.

6. A receptacle comprising:

a box having an opening at its upper portion and a wall portion defining the opening;

a lid capable of closing the opening, the lid having edge portions corresponding to each other, the edge portions abutted against an upper edge portion of the wall portion with the lid closing the opening;

one and another engagement parts arranged to the box, each of the engagement parts comprising a pair of engagement end portions and a pair of bearing holes, the pair of engagement end portions projecting from the wall portion and corresponding to each other, the pair of bearing holes formed in the pair of engagement end portions respectively and corresponding to each other;

one and another engaged parts arranged to the lid and individually engaging with said one and the other engagement parts so that an engagement with the engagement parts is freely released, each of the engaged parts comprising a pair of end receiving portions and a hinge member, the pair of end receiving portions formed the edge portions respectively and corresponding to each other, each of the end receiving portions receiving each of the engagement end portions with the lid closed, the hinge member provided in each of the edge portions so that is freely projected into and retracted from each of the end receiving portions, the hinge member which is projected into each of the end receiving portions being inserted into and engaged with each of the bearing holes;

the lid being kept in a closed state of said opening when said one and the other engagement parts engage with said one and the other engaged parts, and being rotatably opened from one side on the axis of said one engagement part and said one engaged part which are engaged with each other when said one engagement part engages with said one engaged part and an engagement of the other engagement part with the other engaged part is released, and being rotatably opened from the other side on the axis of the other engagement part and the other engaged part which are engaged with each other when said one engagement part engages with said one engaged part and the engagement of said one engagement part with said one engaged part is released;

said one and the other engagement parts being formed so as to be covered with said lid closing said opening;

said one and the other engaged parts being formed so as not to be exposed from an exterior decor portion of said lid;

one and another operating portions arranged to the lid, said one and the other operating portions being respectively connected to one and another hinge members so that an engagement of the hinge member on the operated side with each of the bearing holes is released;

a lock mechanism arranged to the lid, the lock mechanism urging the hinge members of said one and the other engaging parts so that they are projected into the end receiving portions when the lid closes the opening while being in a lid closing state of permitting said one and the other operating portions to be operated, the lock mechanism being transferred from the lid closing state to a lid open-close state of prohibiting said one and the other operating portions from being operated and keeping an state of said one and the other hinge members with respect to the bearing holes when the lid is opened from the operated side in a state that said one or the other operating portion is operated and an engagement of the hinge member with the bearing holes on the operated side is released; and a stopper portion on each of the engagement end portions for preventing the hinge member from being projected until the hinge member is aligned in position with the bearing hole when the lid is closed, and then, the lock mechanism is transferred to the lid open-close state to the lid closing state.

7. The receptacle according to claim 6, wherein the rock mechanism includes a stopper protrusion and a check lever, the stopper protrusion and the check lever are arranged to the lid;

the stopper protrusion moves with the operating portions; and the check lever prevents the stopper protrusion from moving in the lid opening and closing state and permits the stopper protrusion to move in the lid opening state.

8. A receptacle comprising:

a rectangular box having an upper opening;

a lid closing the opening;

two supporting mechanisms between the opening and the lid on right and left sides of the opening, the mechanisms separable connecting the lid body with the box, the mechanisms each having an engagement element, an engaged element and a selected mechanism, the select mechanism each selecting either engaged or unengaged conditions between the engagement element and the engaged element;

protrusion portions formed on one of the rectangular box and the lid, arranged on front and rear sides of the opening with the lid closed, and each having one of the engagement element and the engaged element; and recess portions formed on the other of the rectangular box and the lid, arranged on front and rear sides of the opening with the lid closed, and each having the other of the engagement element and the engaged element.

9. The receptacle according to claim 8, wherein the box has front, rear, right and left wall portions defining the opening, the lid has edge portions on right and left sides of the opening, the edge portions abut against upper edge portions of the right and left wall portions with the lid closed, the protrusion portions each comprises an engagement end portion projecting from each front and rear wall portion, the engagement element is arranged in the end engagement portion, each recess portion is formed at each edge portion and receives the engagement end portion with the lid closed, and the engaged element is arranged in said each edge portion and releasably engages with the engagement element.

10. The receptacle according to claim 9, wherein a clearance is defined between the engagement end portion and the wall portions, said each edge portion has an end covering portion for covering an outside of the engagement end portion with the lid closed, the end covering portion is fitted into the clearance and abutted against a lower end face of the engagement end portion with the lid completely opened.

11. The receptacle according to claim 9, wherein the engaged element is a hinge member which is freely projected into and retracted from said each recess portion, the engagement element is a bearing hole, the hinge member projected into said each recess portion is fitted into the bearing hole, the engagement end portion has a stopper portion for preventing the hinge member from being projected until the hinge member is aligned in position with the bearing hole when the lid is closed.

12. The receptacle according to claim 9, wherein the engagement end portion is provided on each right and left side of the opening.

13. The receptacle according to claim 9, wherein the engaged element is a hinge member which is freely projected into and retracted from said each recess portion, the engagement element is a bearing hole, the hinge member projected into said each recess portion is fitted into the bearing hole, the lid has one and another operating portions, the select mechanism comprises an operating portion and a lock mechanism, the operating portion is connected to the hinge member so that an engagement of the hinge member on an operated side with the bearing hole is released, and the lock mechanism urging the hinge members on right and left sides so that they are projected into the end receiving portions when the lid is closed while being in a lid closing state of permitting the operating portions on right and left sides to be operated, and being transferred from the lid closing state to a lid opening and closing state of prohibiting the operating portions from being operated and keeping states between the hinge members and the bearing holes in right and left sides when the lid is opened from the operated side in a state that the operating portion is operated and an engagement of the hinge member with the bearing hole on the operated side is released.

14. The receptacle according to claim 13, wherein the engagement end portion has a stopper portion for preventing the hinge member from being projected until the hinge member is aligned in position with the bearing hole when the lid is closed, and then, the lock mechanism is transferred to the lid opening and closing state to the lid closing state.

15. The receptacle according to claim 13, wherein the lock mechanism includes a stopper protrusion and a check lever, the stopper protrusion and the check lever are arranged to the lid, the stopper protrusion moves with the operating portions, and the check lever prevents the stopper protrusion from moving in the lid opening and closing state and permits the stopper protrusion to move in the lid opening state.

\* \* \* \* \*